United States Patent [19]
Kondoh et al.

[11] Patent Number: 5,972,070
[45] Date of Patent: Oct. 26, 1999

[54] SINTERED FRICTION MATERIAL, COMPOSITE COPPER ALLOY POWDER USED THEREFOR AND MANUFACTURING METHOD THEREOF

[75] Inventors: Katsuyoshi Kondoh; Yoshishige Takano, both of Hyogo, Japan

[73] Assignee: Sumitomo Electric Industries, Ltd., Osaka, Japan

[21] Appl. No.: 08/919,065

[22] Filed: Aug. 22, 1997

Related U.S. Application Data

[62] Division of application No. 08/535,458, Sep. 28, 1995, Pat. No. 5,824,923.

[30] Foreign Application Priority Data

| Oct. 19, 1994 | [JP] | Japan | .................................... | 6-253240 |
| Oct. 25, 1994 | [JP] | Japan | .................................... | 6-285856 |
| Jan. 19, 1995 | [JP] | Japan | .................................... | 7-26185 |
| Sep. 7, 1995  | [JP] | Japan | .................................... | 7-256795 |

[51] Int. Cl.$^6$ .............................. C22C 1/04; C22C 9/04; C22C 9/06
[52] U.S. Cl. .............................. 75/255; 75/231; 75/247; 75/252; 75/254; 75/352; 75/354; 148/432
[58] Field of Search .......................... 75/231, 247, 252, 75/254, 255, 352, 354; 148/432–436

[56] References Cited

U.S. PATENT DOCUMENTS

| 4,995,924 | 2/1991 | Akutsu et al. ........................... 148/433 |
| 5,004,581 | 4/1991 | Takagi et al. ........................... 148/433 |
| 5,217,814 | 6/1993 | Kawakami et al. ....................... 75/231 |
| 5,326,384 | 7/1994 | Asada et al. ............................. 75/231 |
| 5,518,519 | 5/1996 | Kondoh et al. ........................... 75/231 |
| 5,824,923 | 10/1998 | Kondoh et al. ........................... 75/247 |

FOREIGN PATENT DOCUMENTS

| 0407596 | 1/1991 | European Pat. Off. . |
| 0411882 | 2/1991 | European Pat. Off. . |
| 0469578 | 2/1992 | European Pat. Off. . |
| 0638654 | 2/1995 | European Pat. Off. . |
| 3809994 | 10/1988 | Germany . |
| 58-079073 | 5/1983 | Japan . |
| 58-151444 | 9/1983 | Japan . |
| 60-116751 | 6/1985 | Japan . |
| 61-067737 | 4/1986 | Japan . |
| 63-109131 | 5/1988 | Japan . |
| 4-080105 | 12/1992 | Japan . |
| 2213832 | 8/1989 | United Kingdom . |

*Primary Examiner*—George Wyszomierski
*Attorney, Agent, or Firm*—W. F. Fasse; W. G. Fasse

[57] ABSTRACT

A sintered friction material includes a copper alloy base and hard particles. The copper alloy base includes copper and at least one of, and preferably both, Zn and Ni within a total range of 5 to 40 wt % of the copper alloy base. The hard particles are uniformly dispersed in a matrix formed by the original composite copper alloy powder constituting the base, in a content amount j within a range of 10 to 30 wt % of the friction material.

11 Claims, 4 Drawing Sheets

SINTERED FRICTION MATERIAL, COMPOSITE COPPER ALLOY POWDER USED THEREFOR AND MANUFACTURING METHOD THEREOF

CROSS-REFERENCE TO RELATED APPLICATION

This is a DIVISIONAL of U.S. patent application Ser. No. 08/535,458, filed: Sep. 28, 1995, now U.S. Pat. No. 5,824,923.

BACKGROUND OF THE INVENTION

1. Field of the Invention

The present invention relates to a copper alloy type sintered friction material, and more specifically, to an improvement of corrosion resistance and various mechanical properties such as wear resistance, seizure resistance, coefficient of friction, strength, toughness, hardness and so on of a sintered friction material preferably used for friction sliding parts such as a clutch or a brake or for mechanical sliding parts such as a synchronizing ring, of a vehicle (including a motorcycle).

2. Description of the Related Art

In a vehicle driving system, of which the performance has constantly been improved, a high torque is applied. Therefore, materials of parts used therein have been improved, designs have been studied and, in addition, a lubricant oil, which is one factor of the environment of use, has been improved. For example, an extreme pressure additive to oil based on phosphorus (P) or sulfur (S) has an effect of reducing damage due to wear of the friction sliding parts caused under severe sliding conditions. However, it is well known that products such as hydrogen sulfide ($H_2S$) generated by decomposition of the extreme pressure additive at a high temperature react with non-ferrous metal, causing corrosion of the material.

Concerning the problem of corrosion, brass (copper-zinc alloy) has superior resistance to corrosion due to sulfur. At present, brass is practically used for mechanical parts that are to be employed in such an environment susceptible to corrosion due to sulfur. However, wear resistance and seizure resistance of brass alloy are not superior, and the material has not been designed to have a high coefficient of friction in oil, and hence application of brass alloy as a friction sliding member has been is difficult.

With respect to this problem, Japanese Patent Publication No. 4-80105 discloses that a cast material provided by adding an intermetallic compound of nickel silicide and a metal component such as iron, aluminum, and manganese or the like to a copper-zinc-nickel type alloy realizes a coefficient of friction within the range of from about 0.1 to 0.13 in oil, and that the cast material can be utilized for a synchronizing ring.

While higher grade and higher performance of vehicles have been demanded, it has been found that the driver's shifting feel when he or she shifts the transmission gear can be much improved by improving the coefficient of friction of the synchronizing ring, which is a part of the transmission system. However, a conventional sliding member formed of a copper type alloy including the one disclosed in the aforementioned Japanese Patent Publication No. 4-80105 has the coefficient of friction in oil in the range about 0.1 to 0.15, and hence it cannot exhibit sufficient frictional effect to improve the shifting feel of the driver.

Now, a copper alloy type sintered friction material has been conventionally known as a friction material having relatively high coefficient of friction and, for example, has been disclosed in Japanese Patent Laying-Open Nos. 58-79073, 58-151444, 60-116751, 61-67737, 63-109131 and so on. In the sintered friction materials, in order to improve the coefficient of friction by causing friction resistance at the time of sliding, hard particles or a friction adjusting agent are simply mixed with the copper alloy powder, and the mixed powder is molded and sintered. Therefore, microscopically, even after sintering, the hard particles or the friction adjusting agent do not form a reaction layer with the base copper alloy, but exist with spaces left between the grain boundaries of the original copper alloy powder (especially at triple point of grain boundaries).

As a result, in the conventional copper alloy type sintered friction material, the hard particles or the friction adjusting agent become loose and fall out from the grain boundaries of the sintered material (especially from the triple point of grain boundaries) at the time of friction sliding, and thus form an abraded powder, which powder attacks the counterpart or the sintered friction material itself, causing seizure or damage due to wear. Further, in the conventional copper alloy type sintered friction material, the hard particles or the friction adjusting agent do not have an appropriate grain diameter, and are not dispersed uniformly. Therefore, it is difficult to realize a stable coefficient of friction of at least 0.2 under wet type sliding and at least 0.4 under dry type sliding, which values are required of the high performance friction material.

As described above, it has been desired to provide a copper alloy type sintered friction material having superior resistance to corrosion caused by sulfur, superior wear resistance and superior seizure resistance and stable, relatively high coefficient of friction in oil.

SUMMARY OF THE INVENTION

Therefore, an object of the present invention is to provide a copper alloy type sintered friction material having various mechanical properties improved and corrosion resistance also improved as compared to the prior art, which sintered friction material can be preferably used for synchronizing rings for transmission gears and for transmission parts of a vehicle.

The sintered friction material in accordance with the present invention includes a copper alloy base and hard particles, the copper alloy base includes at least one of Zn and Ni and preferably both Zn and Ni within the range of from 5 to 40 wt %, the hard particles are uniformly dispersed in the original matrix of the composite copper alloy powder constituting the base copper alloy, whereby the sintered friction material has superior resistance to corrosion caused by sulfur and superior wear resistance.

Preferably, the copper alloy base further includes Sn in the range of from 3 to 20 wt %. Preferably, the copper alloy base further includes at least one of Si of 1 to 5 wt %, Al of 0.1 to 5 wt % and Pb of 0.5 to 3 wt %.

The sintered friction material has a coefficient of friction of at least 0.2 under friction sliding in oil, with the counterpart being steel material.

The hard particles preferably have a maximum grain diameter of at most 25 $\mu$m and an average grain diameter of at most 10 $\mu$m.

The hard particles preferably include at least one intermetallic iron alloy selected from the group consisting of FeMo, FeCr, FeTi, FeW and FeB. The sintered friction material may include, as hard particles, particles of $Al_2O_3$ of at most 5 wt % in addition to the particles of an intermetallic iron alloy.

The sintered friction material preferably includes pores having an average diameter of at most 30 μm and dispersed uniformly, in the ratio of at most 20% by volume.

Preferably, the sintered friction material further includes a solid lubricant in the ratio of at most 3 wt %. The solid lubricant preferably includes at least one of graphite, $MoS_2$, $CaF_2$ and BN.

The sintered friction material has tensile strength of at least 400 MPa. The sintered friction material may have tensile strength of at least 500 MPa when subjected to at least one hot plastic deformation selected from among hot extrusion, hot forging, hot pressing and HIP method, after sintering.

In the method of manufacturing the sintered friction material in accordance with the present invention, the sintered friction material includes a copper alloy base and hard particles, the copper alloy base includes at least one of Zn and Ni and preferably both Zn and Ni within the range of from 5 to 40 wt %, the hard particles are uniformly dispersed in the matrix of the original composite copper alloy powder constituting the copper alloy base and are included in an amount from 10 to 30 wt % of the sintered friction material, so as to have superior resistance to corrosion due to sulfur and superior wear resistance, the method including the steps of: preparing a mixed powder including copper alloy powder and hard particles, the copper alloy powder including at least one of Zn and Ni within the range of from 5 to 40 wt %, the hard particles being included in the range of from 10 to 30 wt % in the mixed powder; performing mixing and pulverization of the mixed powder in accordance with at least one of mechanical alloying method, mechanical grinding method and granulation so as to prepare a composite copper alloy powder, so that the hard particles are pulverized to have a maximum grain diameter of at most 25 μm and an average grain diameter of at most 10 μm and simultaneously, are dispersed uniformly in the matrix of the composite copper alloy powder; and molding and sintering the composite copper alloy powder.

Instead of the copper alloy powder, a group of metal powder may be used, the group of metal powder including Cu powder and at least one of Zn powder and Ni powder within the range of 5 to 40 wt %. Preferably, the copper alloy powder further includes Sn within the range of from 3 to 20 wt %. Preferably, the metal powder includes Sn powder within the range of from 3 to 20 wt %.

The mixed powder may include $Al_2O_3$, in addition to at least one intermetallic iron alloy selected from the group consisting of FeMo, FeCr, FeTi, FeW and FeB, as hard particles within the range of at most 5 wt %.

Preferably, the copper alloy powder further includes at least one of 1 to 5 wt % of Si, 0.1 to 5 wt % of Al and 0.5 to 3 wt % of Pb. Preferably, the metal powder further includes at least one of 1 to 5 wt % of Si powder, 0.1 to 5 wt % of Al powder and 0.5 to 3 wt % of Pb powder.

At least one solid lubricant selected from the group consisting of graphite, $MoS_2$, $CaF_2$ and BN may further be included in the ratio of at most 3 wt % in the matrix of composite copper alloy powder.

Each particle of the composite copper alloy powder has a longer diameter DL and a shorter diameter DS, an d preferably, DL is within the range of from 50 to 300 μm and the aspect ratio DL/DS is within the range of from 1 to 5.

A composite copper alloy powder preferably has a fluidity sufficient to flow down through an orifice tube having a diameter of 2.5 μm within 30 seconds per 50 g unit of the powder.

The composite copper alloy powder is preferably molded to have at least 70% true density ratio, and the powder molded body is sintered in the temperature range of from 800° C. to 1200° C. for at least 30 minutes in an atmosphere including at least either an inert gas or a reducing gas.

The sintered body which has been sintered at a sintering temperature Ts within the range of from 800° C. to 1200° C. is preferably heated to a temperature not lower than 500° C. but not 20 higher than the sintering temperature Ts in a reducing gas atmosphere and, immediately thereafter, it is subjected to either hot forging or hot extrusion, whereby mechanical properties of the sintered body are improved.

Preferably, the pressure for hot forging is within the range of from 5 to 8 t/cm$^2$, and the ratio of extrusion of the hot extrusion is at least 10, so that the sintered body becomes sufficiently dense.

The composite copper alloy powder in accordance with the present invention includes a copper alloy base and hard particles uniformly dispersed in the base within the range of from 10 to 30 wt %, and the hard particles have a maximum grain diameter of at most 25 μm and an average grain diameter of at most 10 pm.

Further, the composite copper alloy powder in accordance with the present invention includes a copper alloy base and hard particles uniformly dispersed in the base within the range of from 10 to 30 wt %, and the copper alloy base includes at least one of Zn and Ni within the range of from 5 to 40 wt %.

The method of manufacturing a composite copper alloy powder in accordance with the present invention is characterized in that a mixed powder including a copper alloy powder and, in addition, hard particles within the range of from 10 to 30 wt % is prepared, the mixed powder is subjected to mixing and pulverization in accordance with at least one of mechanical alloying method, mechanical grinding method and granulation so that it is converted to a composite copper alloy powder, whereby the hard particles are pulverized to have a the maximum grain diameter of at most 25 μm and an average grain diameter of at most 10 μm, and simultaneously, are uniformly dispersed in the matrix of the composite copper alloy powder.

Instead of copper alloy powder, a group of metal powders corresponding to the alloy composition may be used.

The foregoing and other objects, features, aspects and advantages of the present invention will become more apparent from the following detailed description of the present invention when taken in conjunction with the accompanying drawings.

DETAILED DESCRIPTION OF THE INVENTION

The hard particles in the present invention are finely and uniformly dispersed in the sliding surface of the sintered friction material, suppress generation of agglutination or agglomeration with a counterpart when friction sliding at room temperature or at a high temperature, improve seizure resistance, and serve to improve the coefficient of friction, as the particles are in direct contact with the surface of the base of the counterpart. However, in order for the hard particles to function in this manner, the hard particles must not become loose and fall out from the base of the sliding surface of the sintered friction material at the time of friction sliding.

Figure 1A:
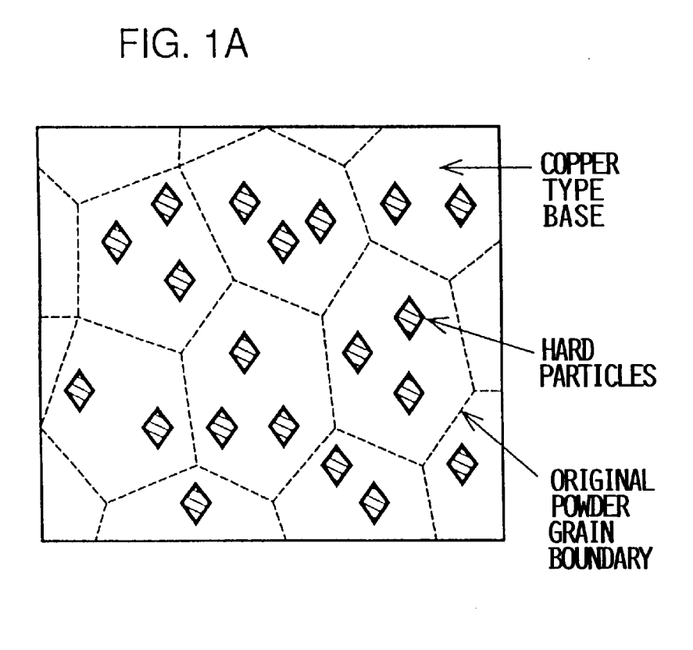
FIG. 1A schematically shows a texture or grain structure of a sintered body prepared using a mechanical grinding method in accordance with the present invention, and FIG. 1B schematically shows a texture of a sintered body prepared using a conventional simple powder mixing.

The inventors considered that the sintered friction material should have such a texture as shown schematically in FIG. 1A in order to exhibit superior effects of the hard particles. More specifically, the sintered friction material should have such a structure in which fine hard particles are dispersed uniformly in the original powder grain of the base copper alloy having a prescribed composition, and in which the hard particles are fixed firmly bonded to the base copper alloy. In the sintered friction material having such a texture, loosening and falling out of hard particles at the time of friction sliding can be suppressed, and hence stable state of friction sliding can be ensured for a long period of time. As a result, fluctuation of the coefficient of friction incidental to the change in the speed of sliding can be suppressed, and further, difference between coefficient of static friction and coefficient of dynamic friction at the start and stop of sliding can be minimized. It has also been found that problems of vibration, chattering, and creaking noise can be solved.

In order to present such a texture as shown in FIG. 1A, the inventors considered that it is necessary to have fine hard particles dispersed uniformly in the matrix of the copper alloy powder and then to have the copper alloy powder prepared in this manner with particles dispersed therein molded and sintered. More specifically, the most important feature of the present invention is to provide a sintered friction material having a texture as shown in FIG. 1A by using copper alloy powder in which hard particles are dispersed.

Through repeated experiments and study, it has been found that the application of a mechanical mixing and pulverizing process of powder is effective as a method of preparing a dispersed particles type copper alloy powder in which fine hard particles are uniformly dispersed in an economical manner. More specifically, by applying a mechanical mixing and pulverizing process of powder represented by a mechanical alloying method, a mechanical grinding method and granulation, an intermetallic compound or metal powder, which are the hard particles, are finely pulverized and, at the same time, the fine hard particles can be uniformly dispersed in the matrix of the copper alloy powder.

Such a mechanical pulverizing and mixing process is performed in dry type method and not wet type method as in the conventional pulverizing or mixing by means of a ball mill. If desired, excessive agglutination or agglomeration of the powder can be prevented by adding a small amount of stearic acid, alcohol or the like as a PCA (process control agent). An attoritor or a ball mill can preferably be used as a processing apparatus. An attoritor is suitable for high speed processing, as it has superior efficiency of pulverization. Though the ball mill requires a long period of processing time, it allows easy control of atmosphere, and hence it is relatively superior in view of economics when the design of applied energy is appropriately performed.

As an alternative, powder having hard particles dispersed therein can be fabricated by adding hard particles to a molten copper alloy, stirring the same for dispersion and atomizing the resulting mixture. However, it is not possible to make the hard particles smaller by atomization, and therefore fine hard particles must be prepared in advance to be added to the molten copper alloy. In that case, the step of sufficient stirring is necessary to prevent agglutination or agglomeration or uneven presence of hard particles in the molten alloy, which increases the cost of manufacturing the composite copper alloy powder, and hence it is not preferable in view of economy. When a large amount of hard particles is to be added, there is also a problem of clogging the atomization nozzle by the hard particles during atomization of the molten copper alloy including the hard particles. In view of the foregoing, mechanical pulverization and mixing of powder is preferred in manufacturing the copper alloy type sintered friction material of the present invention.

As for the desired size and the amount of addition of the hard particles, the inventors evaluated copper type powder having prescribed compositions with various different processing conditions in performing the mechanical pulverizing and mixing process mentioned above. As a result, it was found that the following ranges of the size and the amount of addition of the hard particles are suitable in order to ensure a stable and high coefficient of friction without degrading the mechanical properties. More specifically, it is confirmed that when hard particles having a maximum grain diameter of at most 25 $\mu$m and average grain diameter of at most 10 $\mu$m are contained in the sintered material within the range of from 10 to 30 wt %, the hard particles are uniformly and finely dispersed in the alloy crystal grain of the base, ensuring a stable high coefficient of friction without degrading mechanical properties of the sintered friction material.

Meanwhile, if the content of the hard particles in the whole sintered friction material is not larger than 10 wt %, a high coefficient of friction exceeding 0.2 without seizure under wet friction sliding in oil and exceeding 0.4 without seizure under dry friction sliding cannot be obtained when the friction material slides over a counterpart of steel material such as SPCC, S10C, or S35C in accordance with JIS (Japanese Industrial Standard), and the effect of improving wear resistance cannot be obtained. When the hard particles have a maximum grain diameter larger than 25 $\mu$m, or an average grain diameter exceeding 10 $\mu$m, or when the content exceeds 30 wt % of the whole sintered friction of material, then the hard particles tend to be initiation points of cracks, reducing the strength and toughness of the sintered friction material. Further, addition of the hard particles exceeding 30 wt % significantly wears the counterpart, and the effect of suppressing vibration, chattering, creaking noise or the like mentioned above is reduced.

Desirably, the intermetallic iron alloy as the hard particles includes at least one selected from the group consisting of FeMo, FeCr, FeTi, FeW and FeB. The reason for this is that these intermetallic iron alloys have sufficient hardness suitable as hard particles and are brittle, i.e. easily pulverized, so that when these are used, the hard particles can easily be made fine at the time of mechanical mixing and pulverizing in the present invention. In addition to these intermetallic compounds, metal oxides such as $Al_2O_3$, $SiO_2$, $ZrO$, and ceramics such as SiC, AlN have the effect of improving the coefficient of friction.

However, as compared with the intermetallic iron alloy, these particles degrade the machinability of the sintered friction material, and therefore these are not very preferable in view of economics. Namely, intermetallic iron alloy is more preferable as the hard particles.

However, alumina as the hard particles has the effect of improving high temperature strength and high temperature hardness of the sintered friction material. Therefore, in addition to the intermetallic iron alloy alumina particles may be uniformly dispersed in the base of the alloy, for a sintered friction material requiring superior high temperature characteristics. However, if the content of alumina exceeds 5 wt % of the sintered friction material, then toughness decreases. In order not to degrade the mechanical properties and the friction sliding property of the sintered material, the alumina particles should desirably have an average grain diameter of at most 10 μm.

In summary, copper type powder having a prescribed composition and particles of intermetallic iron alloy are mechanically mixed and pulverized, so that the particles of the intermetallic compound are pulverized to have the maximum grain diameter of at most 25 μm and the average grain diameter of at most 10 μm, and the pulverized particles are dispersed uniformly and finely in the particles of the copper type alloy powder. The mixed and pulverized powder is molded by a mold and then sintered, whereby a reaction layer is formed at the interface between the base copper type alloy and the hard particles of the intermetallic compound, and hence hard particles of the intermetallic compound are firmly fixed in the base. As a result, loosening and falling out of the hard particles from the base of the sintered body during friction sliding can be prevented, a stable state of friction sliding can be ensured, and hence a sintered friction material which ensures a stable high coefficient of friction without causing seizure can be obtained.

Figure 1B:
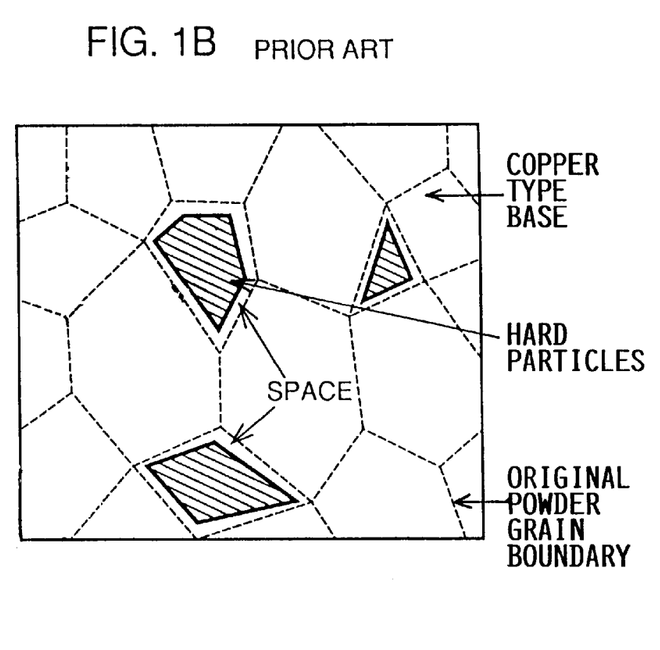

In a simple method of powder mixing in accordance with the conventional powder metallurgy method, the hard particles are not pulverized. Therefore, as shown in the schematic diagram of grain texture of FIG. 1B, the grain diameter of the hard particles is the original grain diameter when mixed in the copper alloy powder. Such hard particles do not disperse in the matrix of the copper alloy powder, and do not react with the copper alloy powder. Therefore, when the mixed powder obtained by the conventional powder metallurgy method is molded and sintered, rough and large hard particles exist at the grain boundary of the original powder (especially at the triple point of grain boundaries) of the base copper alloy, the hard particles fall out from the base, and become an abraded powder causing the problem of abrasive attack against the counterpart or the sintered material itself, or the problem of seizure. If there is a stress applied to the sintered friction material and there are hard particles existing at the original grain boundaries of the powder, then the hard particles provide initiating points and propagation paths of cracks, causing degradation of the mechanical properties of the sintered friction material.

Fluidity of the dispersed hard particles type copper alloy powder will be described. Generally, powder is fed into a metal mold, and pressure molded by means of upper and lower punches. At this time, if the pressure is applied while the powder is not uniformly filled in the metal mold, the density in the molded body becomes uneven, which results in chipping or cracks at end portions, or results in warping of the sintered body after sintering. In order to suppress these problems, the powder must be fed and filled uniformly from the end portions to the inside of the metal mold. Fluidity of the powder is an important factor dominating uniformity in filling the metal mold with the powder.

Here, the powder is a quasi fluid, and hence superior fluidity can be obtained by adjusting the grain size of the powder. The inventors repeated various experiments and study, and found that in order to implement molding steps which allow uniform filling of powder in the metal mold as well as economical mass production, a powder fluidity that requires at most 30 seconds for 50 g of the powder to flow down through an orifice tube having a diameter of 2.5 mm is necessary. More specifically, if powder having a fluidity exceeding 30 sec/50 g is used, it is not economical as mass productivity is hindered, since it takes a much longer time for uniformly filling the metal mold with the powder. In addition, it may be possible that the metal mold cannot be uniformly filled with the powder having such low fluidity, and in that case, there would be the problems of chipping or cracks of the molded body as mentioned above.

It was found that the composite copper alloy powder exhibiting preferable fluidity has longer diameter DL and shorter diameter DS, DL being in the range of from 50 to 300 μm and the aspect ratio DL/DS being in the range of from 1 to 5. More specifically, if the composite copper alloy powder has DL smaller than 50 μm, the fluidity is decreased. If DL exceeds 300 μm or if the aspect ratio DL/DS exceeds 5, moldability of the composite copper alloy powder is decreased, resulting in chipping or cracks at the corners of the powder molded body. Especially, flat shaped powder having the aspect ratio DL/DS of higher than 5 has its fluidity significantly decreased.

When the above described composite copper alloy powder is to be manufactured, the mechanical mixing and pulverizing process of the powder in accordance with the present invention can be applied to copper type powder of any composition, regardless of the composition of the copper alloy base. Therefore, when copper type alloy powder having compositions other than those described in detail in the following, for example, copper type alloy powder having the composition of Cu—Cr, Cu—Be, Cu—Zr, Cu—Ni or the combination of these is used, composite copper alloy powder in which hard particles are dispersed can be manufactured by applying the present invention.

The composition of the copper alloy base desired in the sintered friction material and in the composite copper alloy powder in accordance with the present invention will be described.

Zn has a deoxidizing effect, and if it is added to the base, a stable ZnO layer can be uniformly formed on the entire surface of the sintered body base. The zinc oxide layer may serve as a protection film, and it prevents reaction between copper alloy and S in an atmosphere including sulfur, suppressing generation of copper sulfite which is the cause of corrosion. Meanwhile, if the amount of addition of Zn to the base of copper alloy increases, a β' phase appears, and as a result, the alloy base becomes hard and brittle, resulting in lower strength and lower susceptibility to cold working.

The amount of Zn necessary for suppressing corrosion due to sulfur is at least 5 wt % of the base, and addition of Zn exceeding 40 wt % is not preferred, in order to prevent the base from being brittle. The preferable amount of Zn to be added to is the alloy base is from 5 to 40 wt %.

Ni has an effect of suppressing generation of copper sulfite as does Zn, improving hardness of the alloy base, allowing existence of an intermetallic compound with Si (nickel silicide) in the form of fine spherical particles, and improving the coefficient of friction as the particles of nickel silicide generates resistance at the time of friction sliding. In order to obtain such preferable effects, addition of Ni by at least 5 wt % to the base is necessary. However, if the amount of addition of Ni exceeds 40 wt %, the alloy base becomes brittle, and as a result, machinability during hot and cold working is degraded. Namely, the preferable amount of addition of Ni in the alloy base is from 5 to 40 wt %.

If the total content of Zn and Ni in the copper base exceeds 40 wt %, the sintered material base is significantly hardened, leading to degraded toughness, and hence machinability of the sintered friction material during hot and cold working is degraded. Namely, the preferable content of Zn and Ni together in the alloy base is at most 40 wt %.

Addition of Sn to the alloy base has the effect of improving high temperature strength and toughness of the base, and it also has the effect of improving seizure resistance at a high temperature. Therefore, if the conditions of friction sliding are severe, addition of Sn to the alloy base is preferred. If the amount of addition of Sn is not larger than 3 wt %, the preferable effect cannot be obtained. Meanwhile, if it exceeds 20 wt %, a hard and brittle phase is precipitated in the base, reducing strength and toughness. Namely, the preferable amount of addition of Sn to the alloy base is from 3 to 20 wt %.

Al improves hardness of the alloy, and forms resistance particles at the time of friction sliding, so that it has the effect of improving the coefficient of friction. However, if the amount of addition of Al is not larger than 0.1 wt %, the improvement in hardness and friction resistance is not sufficient. Meanwhile, if Al is added in an amount exceeding 5 wt %, the alloy becomes brittle, machinability during cold working is degraded, and a strong oxide ($Al_2O_3$) layer is formed on the surface of the powder, which degrades the sintering property and machinability of the alloy base. Namely, the preferred amount of addition of Al to the alloy base is from 0.1 to 5 wt %.

As already described, Si and Ni together form a fine spherical intermetallic compound (nickel silicide), which serves to provide resistance at the time of friction sliding, thus improving the coefficient of friction. If the amount of addition of Si is not larger than 1 wt %, a sufficient effect of improving the coefficient of friction cannot be obtained. If the amount of addition of Si exceeds 5 wt %, processability of the alloy base during hot and cold working would be degraded. Therefore, the preferable amount of addition of Si to the alloy base is frqm 1 to 5 wt %.

Pb uniformly exists between a phase grain boundaries and dendrites of the copper alloy base, and has an effect of improving machinability of the base and lubricity during friction sliding. In order to obtain such an effect, addition of Pb of at least 0.5 wt % is necessary. However, if the amount of addition of Pb exceeds 3 wt %, there would be segregation in the alloy base, degrading mechanical properties. Therefore, the preferable amount of addition of Pb to the alloy base is from 0.5 to 3 wt %.

The addition of a solid lubricant reduces attacks of the sintered friction material against the counterpart under severe friction sliding condition, helps maintain a stable coefficient of friction of about 0.2 or higher in oil even when the friction sliding condition such as speed of sliding and applied pressure fluctuates. In addition, as it improves lubricity between s sliding surfaces, it also provides the effect of suppressing vibration or chattering during sliding. As a solid lubricant component having such an effect in the copper alloy type sintered friction material, graphite, $MoS_2$, $CaF_2$, and BN which are preferable also in view of economics may be used. At this time, at least one of graphite, $MoS_2$, $CaF_2$ and BN should preferably be added in the range of at most 3 wt %. Addition of the solid lubricant exceeding 3 wt % is not preferred, since the strength and toughness of the sintered body is degraded.

The inventors tried to use natural flaky graphite powder which has different properties from the spherical graphite powder used in the conventional powder metallurgy method, or expanded graphite powder which is natural flaky graphite powder with its thickness expanded, as the graphite serving as the solid lubricant. More specifically, natural flaky graphite powder and expanded graphite powder have superior moldability, superior property for compression and lubricity, as compared with the spherical graphite powder.

For this reason, while spherical graphite powder degrades mechanical properties of the sintered body because of chipping or cracks in the molded body when it is added by 3 wt % or more, flaky graphite powder or expanded graphite powder having superior moldability does not result in degradation of mechanical properties of the sintered body even when it is added up to 15 wt %. Since flaky graphite powder and expanded graphite have superior lubricity or lubricancy, chattering, vibration and creaking noise during sliding can be more effectively suppressed, fitting with the counterpart at the initial stage of sliding can be improved, and the coefficient of friction can be made more stable. When flaky graphite powder or expanded graphite powder is dispersed in the sintered body, the compression property of the sintered body itself at the time of pressurization can be improved as the graphite powder has a superior compression property, and as a result, not local contact but rather global contact with the sliding surface of the counterpart becomes possible which leads to stabilization of the friction sliding property.

More specifically, as compared with a sintered body employing spherical graphite powder, the sintered body obtained by mixing dispersed hard particles type composite copper alloy powder and at least one of flaky graphite powder and expanded graphite powder, superior mechanical properties and a superior friction sliding property and especially a stable coefficient of friction from the initial stage of sliding can be obtained.

The conditions of molding and sintering of the mixed and pulverized composite copper alloy powder will be described. First, the density of the molded body should at least be 70% in terms of true density ratio. If the true density ratio is smaller than 70%, sufficient strength of the molded body cannot be obtained, and hence chipping or cracks would be generated during the step of transportation prior to sintering of the molded body, and therefore handling would be troublesome. In order that the molded body can be handled easily during the steps of mass production, it must have the true density ratio of at least 70%.

As for the sintering condition, first, sintering must be performed in an atmosphere of an inert gas or a reducing gas. If the sintering atmosphere is not an inert gas or reducing gas atmosphere, there would be an oxide film formed on the surface of the composite copper alloy powder significantly hindering the sintering property, and as a result, the strength and toughness of the sintered body would be degraded. As for the sintering temperature, the sintering phenomenon hardly proceeds at a temperature lower than 600° C. in the composite copper alloy powder molded body. Therefore, the sintering temperature should at least be 600° C. However, in order to complete the sintering phenomenon at such relatively low temperature, the necessary time for sintering is too long to be economical. Therefore, in order to carry out sintering while satisfying economical requirements, a sintering temperature of not lower than 800° C. is preferred. The inventors have confirmed as a method of carrying out sintering in a short period of time in the temperature range of from 600 to 800° C., it is effective to carry out sintering in a pressurized reducing gas atmosphere. If the sintering temperature exceeds 1200° C., liquid phase appears in the powder molded body, and the sintered body contracts. As a result, dimensional precision of the sintered body is degraded. Therefore, the sintering temperature should preferably be at most 1200° C. In order to obtain a sintered body having satisfactory mechanical properties at a sintering temperature in the range of from 800 to 1200° C., the necessary time of sintering is at least 30 min.

The pressure of pores in the sintered friction material has a correlation with mechanical properties such as friction sliding property, strength and hardness of the sintered body in the lubricant oil. Therefore, various experiments and studies have been performed with respect to the correlation. As a result, it has been found that by controlling the size, amount and dispersion of the pores in the sintered body, a sintered friction material having sufficient mechanical properties and a stable coefficient of friction exceeding 0.2 in oil can be obtained.

First, when the average diameter of the pores exceeds 30 $\mu$m, the pores may serve as the initiating point of cracks, significantly reducing the strength and toughness of the sintered material. If the pores are distributed or present in excess of 20% in volume of the sintered material, strength and toughness of the sintered body are degraded, and tensile strength does not reach 400 MPa. Meanwhile, if the pores having an average diameter of at most 30 $\mu$m are uniformly dispersed in the sintered body to at most 20% by volume, the sintered material has a tensile strength of at least 400 MPa, and other mechanical properties are not degraded. Therefore, the sintered material itself can be used as various friction sliding members.

Generally, in friction sliding in a lubricant oil, pores in the sintered friction material have an effect of improving slidability (seizure resistance) with the counterpart, as the pores in the sintered friction material hold oil and form an oil film on the sliding surface. However, in such a wet type friction member, if a thick and strong oil film is formed, the friction coefficient becomes as low as about 0.05 to 0.1. Especially in a copper alloy type sintered friction material, if the amount of pores exceeds 25% by volume, the coefficient of friction significantly reduces.

If the pores are not uniformly distributed, local fitting with the counter part at the time of sliding degrades. As a result, a stable coefficient of friction cannot be obtained and seizure with the counterpart at the time of sliding is more likely. Therefore, in order to ensure good mechanical properties and a good friction sliding property of the sintered friction material, it is preferred that pores having an average diameter of at most 30 $\mu$m are uniformly dispersed within the range up to 20% by volume in the sintered body. The size and amount of pores can be controlled by adjusting the pressure during molding of the powder.

As described above, according to the present invention, it is possible to obtain a sintered friction material having superior mechanical properties. However, sometimes higher strength and higher toughness may be desired, in order to obtain a friction member which also serves as a structural part by a single sintered body.

More specifically, some parts of vehicles require not only a good friction sliding property but also higher strength. For example, a synchronizing ring for a first transmission gear or for a second transmission gear upon which a high load acts, requires a tensile strength as high as exceeding 400 MPa. Such requirement may be met by the following two approaches.

One is to provide a two-layered structure in which the copper type sintered friction member of the present invention is used at an inner diameter part of the synchronizing ring requiring good friction sliding property and using an alloy type material at an outer diameter part requiring strength. At this time, the outer peripheral portion and inner peripheral portion may be firmly bonded by a diffusion junction method or welding.

Another approach is to improve the mechanical properties of the sintered body by reducing the amount of pores in the sintered body and making the sintered body dense, by hot plastic deformation such as hot forging, hot extrusion, hot pressing or HIP (Hot Isostatic Pressing) method. This enables a tensile strength of as high as 500 MPa or higher to be achieved. Therefore, the copper alloy type friction material which comes to have such high strength can be used by itself, for the synchronizing ring.

As for the examples of hot plastic deformation, in hot forging and hot extrusion, the sintered body must be preheated before deformation processing. The temperature range thereof should at least be 500° C. and should not be higher than the sintering temperature Ts. If the temperature of preheating is lower than 500° C., deformation resistance of the sintered body is too large to make the sintered body dense, and in addition it is not preferable in view of economy, since a large scale facility for applying high pressure to the sintered body to make the sintered body dense becomes necessary. Further, under high pressure, life of the metal mold or extrusion dies would be shorter. Meanwhile, if preheating is performed at a temperature higher than the sintering temperature Ts, the precipitation phase in the sintered alloy suffers from phase variation, causing degradation of mechanical properties. Here, the pressure during hot forging should preferably be within the range of from 5 to 8 t/cm$^2$, also in view of economy. If the ratio of extrusion is 10 or more, the sintered body can be made dense, and mechanical properties can be improved.

As described above, the sintered friction material having such a texture and alloy composition obtained by the present invention has sufficient mechanical properties such as strength, toughness and hardness as well as wear resistance and seizure resistance to be used by itself without any reinforcing material. The sintered friction material does not suffer from corrosion due to sulfur even in an atmosphere including sulfur, has a high friction coefficient exceeding about 0.2 in oil and exceeding 0.4 in dry type sliding, and the coefficient of friction is stable against fluctuation of the friction sliding conditions. Therefore, the copper alloy type sintered friction material obtained by the present invention can preferably be used as a friction surface member for a clutch, brake or synchronizing ring for a transmission.

DESCRIPTION OF THE PREFERRED EMBODIMENTS

First, a specific example of a mechanical pulverizing and mixing process of the mixed powder including copper alloy powder and hard particles will be described, and FIG. 2 is a photograph of the texture of the composite copper alloy powder obtained by the process. In this specific example, 20 wt % of FeMo particles were added to atomized copper alloy powder including 18 wt % of Zn, 18 wt % of Ni and a remaining part of copper. The hard particles of the added FeMo had an average grain diameter of 50 $\mu$m. 800 g of the mixed powder to which hard particles were added and 8 kg of steel balls having a diameter of ⅜ inches were put into a pot container for a vibration mill formed of stainless steel SUS304 (having the volume of 12560 cm$^3$). The container was evacuated to 1×10$^{-4}$ Torr and an argon gas substituting process was performed for 30 minutes. The pot was continuously vibrated for 5 hours at a vibration frequency of 1100 Hz and an amplitude of 10 mm, thus realizing a mechanical mixing and pulverizing process.

Figure 2A:
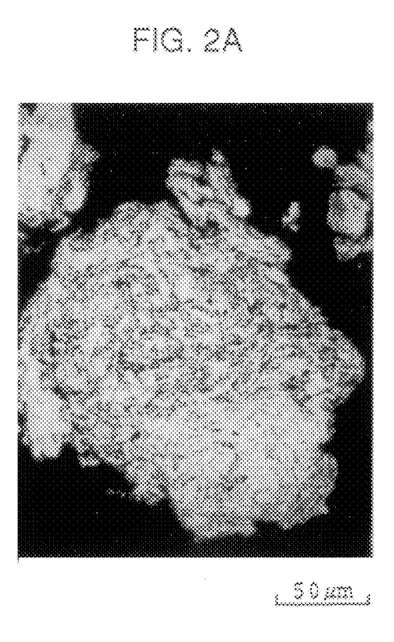
FIG. 2A is a photograph of the entire shape of a composite copper alloy powder particle subjected to mechanical grinding in accordance with the present invention, showing the metal texture thereof.
Figure 2B:
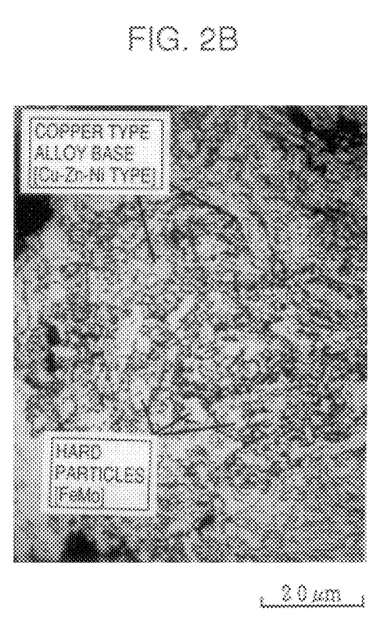
FIG. 2B is an enlargement of a part of the photograph of FIG. 2A.

FIG. 2 is an example of a microscopic photograph showing the texture of the composite copper alloy powder obtained in this manner. To prepare the photograph, the powder particles were embedded in resin, and a cross-section was exposed by grinding. FIG. 2A shows the whole shape of the composite copper alloy powder particles. FIG. 2B is a photograph showing, in enlargement, part of the texture of FIG. 2A. The hard particles of FeMo are made as small as having a maximum grain diameter of 9 μm and an average grain diameter of about 6 μm, and it can be seen that the hard particles are uniformly dispersed in the matrix of the composite copper alloy powder. The composite copper alloy powder particles of FIG. 2A have a longer diameter DL of 188 μm and a shorter diameter DS of 134 μm, and therefore the aspect ratio DL/DS is 1.4.

to 300 μm and aspect ratio DL/DS within the range of from 1 to 5 in accordance with the present invention has the fluidity of at most 30 sec per 50 g powder, good powder molded bodies without chipping or cracks could be obtained, and the sintered bodies did not warp.

Meanwhile, samples K to O for comparison suffered from the following problems.

In sample K, the longer diameter DL of the powder particles was as small as 25 μm, so that powder clogged in the orifice tube, and fluidity could not be evaluated. In the powder molded body obtained by manually filling the powder in the metal mold, density was uneven, chipping was observed at the corners of the molded body and the sintered body warped.

In sample L, the longer diameter DL was 40 μm which was smaller than the inventive preferred limit of 50 μm, and hence the fluidity of the powder was 48 sec/50 g which was

TABLE 1

| Sample | Powder Property | | | | Appearance of Molded Body | Appearance of Sintered Body |
| | Longer Diameter DL (μm) | Shorter Diameter DS (μm) | Aspect Ratio (DL/DS) | Fluidity sec/50 g | | |
| --- | --- | --- | --- | --- | --- | --- |
| A | 60 | 28 | 2.1 | 27 | Good, Chip · Crack Not Observed | Good, Warp Not Observed |
| B | 63 | 41 | 1.5 | 26 | Good, Chip · Crack Not Observed | Good, Warp Not Observed |
| C | 74 | 36 | 2.1 | 28 | Good, Chip · Crack Not Observed | Good, Warp Not Observed |
| D | 88 | 28 | 3.1 | 28 | Good, Chip · Crack Not Observed | Good, Warp Not Observed |
| E | 97 | 49 | 2.0 | 26 | Good, Chip · Crack Not Observed | Good, Warp Not Observed |
| F | 108 | 66 | 1.6 | 24 | Good, Chip · Crack Not Observed | Good, Warp Not Observed |
| G | 120 | 89 | 1.4 | 24 | Good, Chip · Crack Not Observed | Good, Warp Not Observed |
| H | 160 | 141 | 1.1 | 23 | Good, Chip · Crack Not Observed | Good, Warp Not Observed |
| I | 214 | 201 | 1.1 | 23 | Good, Chip · Crack Not Observed | Good, Warp Not Observed |
| J | 275 | 268 | 1.0 | 21 | Good, Chip · Crack Not Observed | Good, Warp Not Observed |
| K | 25 | 10 | 2.5 | Did not flow | Chip Observed at Molded Body Corners | Warp Observed |
| L | 40 | 18 | 2.2 | 48 | Chip Observed at Molded Body Corners | Warp Observed |
| M | 380 | 364 | 1.0 | 20 | Chip Observed at Molded Body Corners | Warp Observed |
| N | 86 | 15 | 5.7 | 55 | Chip Observed at Molded Body Corners | Warp Observed |
| O | 109 | 18 | 6.1 | 52 | Chip Observed at Molded Body Corners | Warp Observed |

Table 1 shows the influence of longer diameter DL, shorter diameter DS and aspect ratio DL/DS of the composite copper alloy powder particles on fluidity, moldability and sintering property of the powder. Samples A to O of composite copper alloy powder in Table 1 have the same composition as the powder of FIG. 2 and were manufactured by using the same vibration ball mill. However, the longer diameter DL, shorter diameter DS and aspect ratio DL/DS of the powder particles were changed variously, by changing the amount of balls introduced, the conditions of vibration, the time of processing and so on of the vibration ball mill.

The fluidity of the powder was evaluated by the amount of time (seconds) required for 50 g of the powder to completely flow down an orifice tube having a diameter of 2.5 mm. In order to evaluate moldability of the powder, powder was molded by an O shaped metal mold having an outer diameter of 140 mm, an inner diameter of 80 mm and a thickness of 3 mm. The powder was fed to the metal mold by using an automatic powder feeding apparatus. However, powder having extremely low fluidity or powder which did not flow was fed manually. Pressure of 6 t/cm$^2$ was applied to the powder filled in the metal mold. The powder molded body molded in this manner was sintered thereafter.

As can be seen from Table 1, powder samples A to J having the longer diameter DL within the range of from 50 inferior to the 30 sec/50 g preferably attained according to the invention, so that it was not suitable for the molding step for mass production. Further, since there was a difference in density at the corners and the center portion of the molded body, chipping was observed at the corners of the molded body, and the sintered body warped.

In sample M, the longer diameter DL was 380 μm which was larger than the inventive preferred limit of 300 μm, and hence it was difficult to uniformly compress the powder in the metal mold. As a result, there is an unevenness of density in the powder molded body, causing chipping at the corners of the molded body, and the sintered body warped.

In samples N and O, the aspect ratio DL/DS was larger than 5, and fluidity was significantly inferior as exceeding 50 sec/50 g. Therefore, these cannot be used for the step of molding for mass production. Further, since the powder particles had a flat shape, it was difficult to uniformly compress the powder in the metal mold, and as a result, density in the molded body became uneven, causing chipping at the corners of the molded body, and the sintered body warped.

TABLE 2

| | | Base | | | | | | | | Hard Particles | | | | | | Solid Lubricant | | | | | Pore |
|---|---|---|---|---|---|---|---|---|---|---|---|---|---|---|---|---|---|---|---|---|---|
| Sample | Step | Zn | Ni | Zn + Ni | Sn | Si | Al | Pb | Cu | FeMo | FeCr | FeW | FeTi | FeB | Total | A | B | C | D | Total | Vol. % |
| 1 | a | 8 | 0 | 8 | 0 | 0 | 0 | 0 | RP | 20 | 0 | 0 | 0 | 0 | 20 | 0 | 0 | 0 | 0 | 0 | 5 |
| 2 | c | 15 | 0 | 15 | 10 | 0 | 0 | 0 | RP | 20 | 0 | 0 | 0 | 0 | 20 | 1 | 0 | 0 | 0 | 1 | 5 |
| 3 | a | 25 | 0 | 25 | 0 | 0 | 3 | 0 | RP | 0 | 15 | 0 | 0 | 0 | 15 | 0 | 1 | 0 | 0 | 1 | 8 |
| 4 | a | 33 | 0 | 33 | 0 | 3 | 0 | 0 | RP | 0 | 15 | 0 | 0 | 0 | 15 | 0 | 0 | 0 | 0 | 0 | 10 |
| 5 | a | 40 | 0 | 40 | 0 | 0 | 0 | 0 | RP | 20 | 0 | 0 | 0 | 0 | 20 | 0 | 1 | 0 | 0 | 1 | 8 |
| 6 | d | 0 | 10 | 10 | 10 | 0 | 0 | 0 | RP | 20 | 0 | 0 | 0 | 0 | 20 | 0 | 0 | 0 | 0 | 0 | 5 |
| 7 | b | 0 | 18 | 18 | 0 | 0 | 2 | 0 | RP | 0 | 15 | 0 | 0 | 0 | 15 | 0 | 0 | 0 | 0 | 0 | 5 |
| 8 | b | 0 | 30 | 30 | 0 | 0 | 2 | 0 | RP | 0 | 15 | 0 | 0 | 0 | 15 | 0 | 0 | 0 | 0 | 0 | 5 |
| 9 | c | 0 | 37 | 37 | 9 | 0 | 0 | 0 | RP | 0 | 0 | 0 | 25 | 0 | 25 | 0 | 0 | 0 | 0 | 0 | 7 |
| 10 | a | 5 | 28 | 33 | 0 | 0 | 0 | 0 | RP | 20 | 0 | 0 | 0 | 0 | 20 | 1 | 0 | 0 | 0 | 1 | 12 |
| 11 | a | 12 | 20 | 32 | 0 | 0 | 0 | 0 | RP | 20 | 0 | 0 | 0 | 0 | 20 | 0 | 1 | 0 | 0 | 1 | 9 |
| 12 | c | 18 | 18 | 36 | 9 | 0 | 0 | 0 | RP | 20 | 0 | 0 | 0 | 0 | 20 | 0 | 0 | 0 | 0 | 0 | 5 |
| 13 | a | 32 | 5 | 37 | 0 | 0 | 0 | 0 | RP | 20 | 0 | 0 | 0 | 0 | 20 | 1 | 0 | 0 | 0 | 1 | 11 |
| 14 | d | 18 | 18 | 36 | 9 | 0 | 3 | 0 | RP | 15 | 0 | 0 | 0 | 0 | 15 | 0 | 0 | 0 | 0 | 0 | 10 |
| 15 | b | 18 | 18 | 36 | 0 | 3 | 0 | 0 | RP | 25 | 0 | 0 | 0 | 0 | 25 | 0 | 0 | 1 | 0 | 1 | 12 |
| 16 | a | 18 | 13 | 36 | 0 | 4 | 0 | 0 | RP | 0 | 10 | 0 | 0 | 10 | 20 | 2 | 0 | 0 | 0 | 2 | 9 |
| 17 | a | 18 | 18 | 36 | 0 | 0 | 0 | 0 | RP | 0 | 0 | 10 | 10 | 0 | 20 | 0 | 0 | 0 | 0 | 0 | 5 |
| 18 | c | 18 | 18 | 36 | 9 | 0 | 0 | 0 | RP | 20 | 0 | 0 | 0 | 0 | 20 | 0 | 0 | 0 | 0 | 0 | 6 |
| 19 | d | 18 | 18 | 36 | 15 | 0 | 0 | 0 | RP | 20 | 0 | 0 | 0 | 0 | 20 | 0 | 0 | 0 | 0 | 0 | 6 |
| 20 | c | 18 | 18 | 36 | 9 | 3 | 0 | 0 | RP | 20 | 0 | 0 | 0 | 0 | 20 | 0 | 0 | 0 | 2 | 2 | 6 |
| 21 | c | 18 | 18 | 36 | 9 | 0 | 0 | 0 | RP | 20 | 0 | 0 | 0 | 0 | 20 | 1 | 0 | 0 | 0 | 1 | 8 |
| 22 | c | 18 | 18 | 36 | 10 | 2 | 2 | 0 | RP | 20 | 0 | 0 | 0 | 0 | 20 | 0 | 0 | 0 | 0 | 0 | 10 |
| 23 | c | 18 | 18 | 36 | 9 | 0 | 0 | 1 | RP | 20 | 0 | 0 | 0 | 0 | 20 | 0 | 0 | 0 | 0 | 0 | 5 |

Note: Remaining Part → RP

TABLE 3

| | | Base | | | | | | | | Hard Particles | | | | | | Solid Lubricant | | | | | Pore | |
|---|---|---|---|---|---|---|---|---|---|---|---|---|---|---|---|---|---|---|---|---|---|---|
| Sample | Step | Zn | Ni | Zn + Ni | Sn | Si | Al | Pb | Cu | FeMo | FeCr | FeW | FeTi | FeB | Total | A | B | C | D | Total | Vol. % | R |
| 24 | c | 2 | 1 | 3 | 9 | 0 | 0 | 0 | RP | 20 | 0 | 0 | 0 | 0 | 20 | 0 | 0 | 0 | 0 | 0 | 5 | |
| 25 | c | 30 | 20 | 50 | 9 | 0 | 0 | 0 | RP | 20 | 0 | 0 | 0 | 0 | 20 | 0 | 0 | 0 | 0 | 0 | 5 | |
| 26 | a | 18 | 18 | 36 | 0 | 0 | 0 | 0 | RP | 0 | 0 | 0 | 0 | 0 | 0 | 0 | 0 | 0 | 0 | 0 | 8 | |
| 27 | d | 18 | 18 | 36 | 9 | 0 | 0 | 0 | RP | 5 | 0 | 0 | 0 | 0 | 5 | 0 | 0 | 0 | 0 | 0 | 8 | |
| 28 | d | 18 | 18 | 36 | 9 | 0 | 0 | 0 | RP | 40 | 0 | 0 | 0 | 0 | 40 | 0 | 0 | 0 | 0 | 0 | 8 | |
| 29 | d | 18 | 18 | 36 | 25 | 0 | 0 | 0 | RP | 20 | 0 | 0 | 0 | 0 | 20 | 0 | 0 | 0 | 0 | 0 | 10 | |
| 30 | c | 18 | 18 | 36 | 9 | 8 | 0 | 0 | RP | 20 | 0 | 0 | 0 | 0 | 20 | 0 | 0 | 0 | 0 | 0 | 6 | |
| 31 | c | 18 | 18 | 36 | 9 | 0 | 10 | 0 | RP | 20 | 0 | 0 | 0 | 0 | 20 | 0 | 0 | 0 | 0 | 0 | 5 | |
| 32 | c | 18 | 18 | 36 | 9 | 0 | 0 | 6 | RP | 20 | 0 | 0 | 0 | 0 | 20 | 0 | 0 | 0 | 0 | 0 | 5 | |
| 33 | c | 18 | 18 | 36 | 10 | 0 | 0 | 0 | RP | 20 | 0 | 0 | 0 | 0 | 20 | 5 | 0 | 0 | 0 | 5 | 10 | |
| 34 | c | 18 | 18 | 36 | 9 | 0 | 0 | 0 | RP | 20 | 0 | 0 | 0 | 0 | 20 | 0 | 5 | 0 | 0 | 5 | 10 | |
| 35 | c | 18 | 18 | 36 | 15 | 9 | 0 | 0 | RP | 20 | 0 | 0 | 0 | 0 | 20 | 0 | 0 | 0 | 0 | 0 | 30 | |
| 36 | d | 18 | 18 | 36 | 15 | 9 | 0 | 0 | RP | 20 | 0 | 0 | 0 | 0 | 20 | 0 | 0 | 0 | 0 | 0 | 10 | *1 |
| 37 | d | 18 | 18 | 36 | 15 | 0 | 0 | 0 | RP | 20 | 0 | 0 | 0 | 0 | 20 | 0 | 0 | 0 | 0 | 0 | 6 | *2 |
| 38 | d | 18 | 18 | 36 | 15 | 0 | 0 | 0 | RP | 20 | 0 | 0 | 0 | 0 | 20 | 0 | 0 | 0 | 0 | 0 | 8 | *3 |
| 39 | — | 18 | 18 | 36 | 15 | 0 | 0 | 0 | RP | 20 | 0 | 0 | 0 | 0 | 20 | 0 | 0 | 0 | 0 | 0 | 8 | *4 |

Notes:
Remaining Part → RP
Remarks → R

Tables 2 and 3 show steps of manufacturing and composition of the samples of sintered friction materials in accordance with the embodiment of the present invention and examples for comparison. Reference characters (a) to (d) in the column labelled "step" in Tables 2 and 3 indicate that ring-shaped friction test samples were manufactured by the steps (e) to (g) after the identified one of the steps (a) to (d) of FIG. 3.

Figure 3:
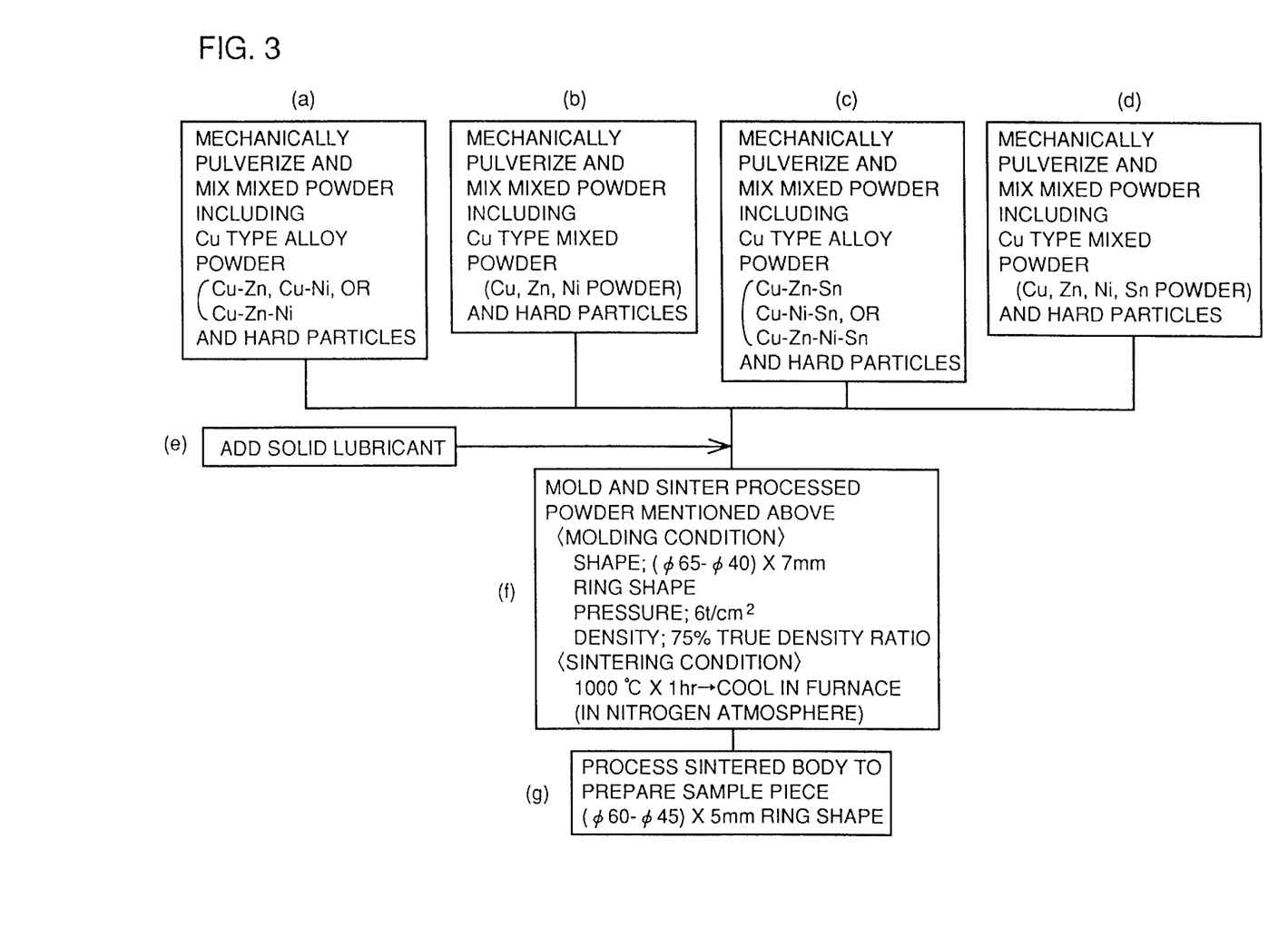
FIG. 3 is a flow chart showing steps of manufacturing the sintered friction material in accordance with the present invention.

In step (a) of FIG. 3, mixed powder of Cu type alloy powder, that is, Cu—Zn, Cu—Ni or Cu—Zn—Ni and hard particles are mechanically pulverized and mixed. In step (b), Cu type mixed powder including Cu, Zn and/or Ni and hard particles are mechanically pulverized and mixed. In step (c), Cu type alloy powder of Cu—Zn—Sn, Cu—Ni—Sn or Cu—Zn—Ni—Sn and hard particles are mechanically pulverized and mixed. In step (d), Cu type mixed powder including powder of Cu, Zn, Ni and/or Sn and hard particles are mechanically pulverized and mixed. At this time, for the mechanical pulverizing and mixing process, at least one of mechanical alloying method, mechanical grinding method and granulation is used. In steps (a) to (d), Si, Al and/or Pb may be added as needed.

After any of the steps (a) to (d), in step (e), a solid lubricant is added as needed.

Thereafter, in step (f), the processed powder is molded to have a ring shape having an outer diameter of 65 mm, an inner diameter of 40 mm and a thickness of 7 mm, and to have a true density ratio of about 75%, by applying pressure of about 6 t/cm², sintered for one hour at a temperature of about 1000° C. in a nitrogen atmosphere, and thereafter cooled in the furnace. The properties of the sintered body are hardly influenced even when a hydrogen atmosphere is substituted for the nitrogen atmosphere.

Finally, in step (g), the sintered body is machined, to be shaped into a ring having an outer diameter of 60 mm, an inner diameter of 45 mm, and a thickness of 5 mm.

Referring to Tables 2 and 3, the numerals associated with Zn, Ni, Sn, Si, Al, Pb and Cu represent percentages by weight of these components in the base alloy. Meanwhile, the numerals associated with the hard particles and the solid lubricants represent percentages by weight with respect to the whole sintered material. The numerals associated with the pores represent percentage by volume with respect to the whole sintered material. Reference characters A, B, C and D of the solid lubricants represent graphite, $MoS_2$, $CaF_2$ and BN, respectively.

In sample 36 accompanied by *1 in the Remarks (R) column of Table 3, the mixed powder was mechanically pulverized and mixed in accordance with step (a). However, by changing the pressurizing condition at the time of powder molding, the diameter of the pores distributed in the powder molded body was changed to 45 μm on average, and thereafter the molded body was sintered.

In sample 37, for which *2 is indicated in the Remarks (R) column, the mixed powder was mechanically pulverized and mixed in accordance with step (a). However, by changing the condition of pulverization, the maximum grain diameter of the hard particles was made 40 μm, and thereafter the mixed powder was molded and sintered.

In sample 38, to which *3 is appended in the Remarks (R) column, the mixed powder was mechanically pulverized and mixed in accordance with step (a). However, the condition for pulverization was changed so that the hard particles had an average grain diameter of 25 μm, and thereafter the mixed powder was molded and sintered.

Sample 39, to which *4 is appended in the Remarks (R) column was simply mixed without any mechanical pulverization in accordance is with mechanical alloying method, mechanical grinding method or granulation, and thereafter sintered in accordance with step (f).

TABLE 4

| Sample | Mechanical Strength | | Friction Sliding Property | | | | | Resistance to |
|---|---|---|---|---|---|---|---|---|
| | UTS MPa | Elongation % | μ (Value) | Δμ | Amount of Wear | | Damages | Corrosion Due to Sulfur |
| | | | | | Sintered Material | S35C Material | | |
| 1 | 410 | 8.2 | 0.32 | 0.09 | 6 | 4 | Not Observed | Not Observed |
| 2 | 435 | 7.3 | 0.36 | 0.06 | 7 | 5 | Not Observed | Not Observed |
| 3 | 440 | 6.7 | 0.35 | 0.05 | 5 | 5 | Not Observed | Not Observed |
| 4 | 460 | 5.8 | 0.36 | 0.09 | 6 | 5 | Not Observed | Not Observed |
| 5 | 475 | 5.1 | 0.33 | 0.04 | 9 | 6 | Not Observed | Not Observed |
| 6 | 415 | 8.5 | 0.32 | 0.08 | 7 | 5 | Not Observed | Not Observed |
| 7 | 438 | 7.4 | 0.34 | 0.08 | 6 | 4 | Not Observed | Not Observed |
| 8 | 460 | 5.6 | 0.33 | 0.09 | 8 | 5 | Not Observed | Not Observed |
| 9 | 465 | 5.9 | 0.41 | 0.08 | 5 | 6 | Not Observed | Not Observed |
| 10 | 453 | 5.7 | 0.37 | 0.06 | 7 | 6 | Not Observed | Not Observed |
| 11 | 450 | 6.1 | 0.36 | 0.05 | 5 | 5 | Not Observed | Not Observed |
| 12 | 460 | 5.7 | 0.37 | 0.08 | 8 | 5 | Not Observed | Not Observed |
| 13 | 455 | 6.2 | 0.36 | 0.05 | 7 | 6 | Not Observed | Not Observed |
| 14 | 448 | 6.9 | 0.35 | 0.09 | 5 | 4 | Not Observed | Not Observed |
| 15 | 460 | 5.9 | 0.44 | 0.05 | 6 | 5 | Not Observed | Not Observed |
| 16 | 450 | 6.2 | 0.39 | 0.03 | 7 | 5 | Not Observed | Not Observed |
| 17 | 448 | 6.9 | 0.36 | 0.07 | 5 | 6 | Not Observed | Not Observed |
| 18 | 463 | 5.8 | 0.36 | 0.09 | 7 | 6 | Not Observed | Not Observed |
| 19 | 460 | 5.8 | 0.36 | 0.07 | 5 | 4 | Not Observed | Not Observed |
| 20 | 455 | 6.0 | 0.38 | 0.03 | 6 | 3 | Not Observed | Not Observed |
| 21 | 456 | 6.1 | 0.37 | 0.05 | 6 | 5 | Not Observed | Not Observed |
| 22 | 460 | 5.8 | 0.38 | 0.09 | 8 | 6 | Not Observed | Not Observed |
| 23 | 460 | 5.7 | 0.37 | 0.08 | 8 | 5 | Not Observed | Not Observed |
| 24 | 380 | 9.8 | 0.30 | 0.08 | 9 | 6 | Not Observed | Corrosion Due to Sulfur Observed |
| 25 | 370 | 1.1 | 0.31 | 0.07 | 6 | 5 | Not Observed | Not Observed |
| 26 | 520 | 7.0 | 0.85 | 0.35 | $2 \times 10^3$ | $-2 \times 10^3$ | Seizure Observed | Not Observed |
| 27 | 480 | 6.7 | 0.81 | 0.30 | $1 \times 10^3$ | $-1 \times 10^3$ | Seizure Observed | Not Observed |
| 28 | 320 | 0.8 | 0.32 | 0.06 | 8 | 5 | Not Observed | Not Observed |
| 29 | 335 | 2.1 | 0.60 | 0.18 | 85 | 250 | Attacking Against Counter Part | Not Observed |
| 30 | 340 | 0.9 | 0.39 | 0.08 | 10 | 5 | Not Observed | Not Observed |
| 31 | 305 | 0.7 | 0.40 | 0.09 | 8 | 6 | Not Observed | Not Observed |
| 32 | 380 | 2.2 | 0.31 | 0.04 | 5 | 4 | Not Observed | Not Observed |
| 33 | 295 | 0.4 | 0.36 | 0.03 | 7 | 5 | Not Observed | Not Observed |
| 34 | 283 | 0.3 | 0.34 | 0.03 | 7 | 6 | Not Observed | Not Observed |
| 35 | 310 | 0.6 | 0.28 | 0.05 | 5 | 4 | Not Observed | Not Observed |
| 36 | 368 | 1.2 | 0.33 | 0.08 | 6 | 6 | Not Observed | Not Observed |

TABLE 4-continued

| | Mechanical Strength | | Friction Sliding Property | | | | | Resistance to |
|---|---|---|---|---|---|---|---|---|
| Sample | UTS MPa | Elongation % | μ (Value) | Δμ | Amount of Wear Sintered Material | S35C Material | Damages | Corrosion Due to Sulfur |
| 37 | 350 | 0.7 | 0.35 | 0.09 | 9 | 5 | Not Observed | Not Observed |
| 38 | 360 | 0.9 | 0.33 | 0.07 | 5 | 5 | Not Observed | Not Observed |
| 39 | 345 | 1.2 | 0.78 | 0.28 | $4 \times 10^3$ | $-3 \times 10^3$ | Seizure Observed | Not Observed |

Table 4 shows mechanical properties, friction sliding property and resistance against corrosion caused by sulfur, based on the result of tensile test, friction test and corrosion test on the sintered body samples having the compositions shown in Tables 2 and 3.

Referring to Table 4, it can be seen that samples 1 to 23 in accordance with the embodiment of the present invention have tensile strength UTS exceeding 400 MPa and exhibit elongation of at least 5%. By contrast, most of the samples 24 to 39 for comparison have tensile strength UTS not higher than 400 MPa, and these samples hardly exhibit elongation. In other words, it can be understood that the samples in accordance with the embodiment of the present invention have higher strength and higher toughness than the samples for comparison.

Figure 4:
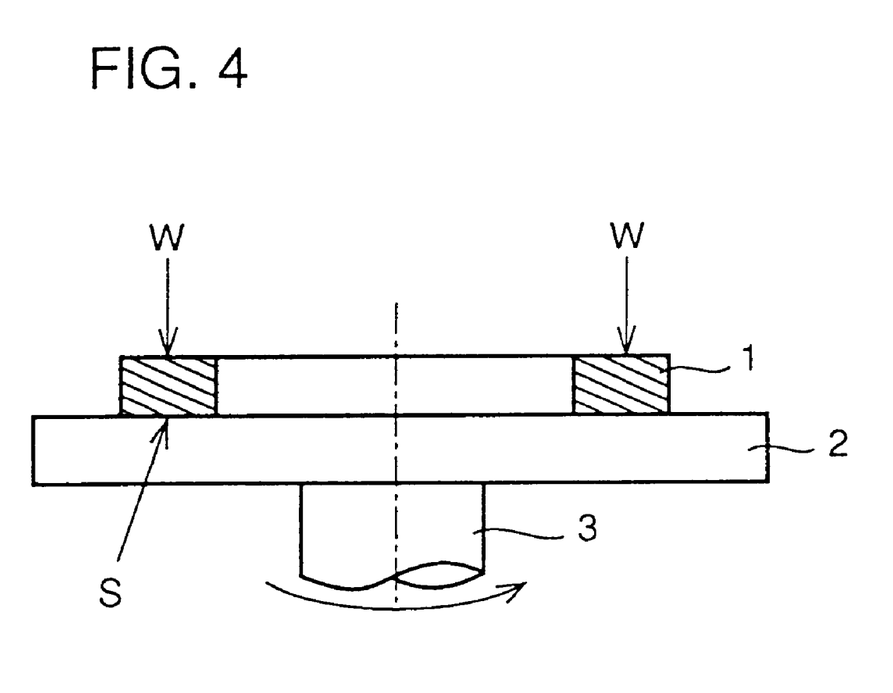
FIG. 4 is an illustration of a friction test.

The friction sliding property was measured by wet type friction test such as shown in FIG. 4. In TOYOTA 70W 90 oil (lubricant oil DEXRON II for automatic transmission may be used to the same effect), a sample piece 1 of the sintered material was caused to slide relative to a counterpart 2 of steel material S35C on a sliding surface S. Sample piece 1 has a ring shape having an outer diameter of 60 mm, an inner diameter of 45 mm and a thickness of 5 mm as already mentioned, and shown cut in section in FIG. 4. The counterpart 2 is a disk having a diameter of 70 mm and a thickness of 5 mm, and was caused to rotate on a shaft 3 as denoted by the arrow around the axis of shaft 3. The sample piece 1 was fixed, and a pressure W of 5 Kgf/cm² was applied against the counterpart 2. Relative sliding speed between the sample piece 1 and the counterpart 2 at the sliding surface S was 10 m/sec and the friction time was one hour.

As can be seen from Table 4, samples 1 to 23 in accordance with the embodiment of the present invention exhibited relatively high stable coefficient p of friction in the steady state of from 0.3 to 0.4. By contrast, the values of the coefficient μ of friction in the steady state varied in samples 24 to 39 for comparison. Especially, the value pμ of about 0.7 or higher means that there was a seizure. The initial value of μ of the sample which exhibited such a large final μ value during frictional sliding was not higher than 0.2. In the samples in accordance with the embodiment of the invention, the value of Δμ representing the difference between coefficient of static friction and coefficient of dynamic friction was at most 0.09. By contrast, Δμ of some samples for comparison well exceeded 0.1.

As for the amount of wear of the sintered sample piece 1 and the counterpart 2, the samples in accordance with the embodiment of the invention exhibited stable and small amount of wear. By contrast, some of the samples for comparison exhibited a considerably large amount of wear or adhesion. In the column of the amount of wear in Table 4, the absolute value of the numerals with negative sign represents the amount of increase in weight due to adhesion.

As for the damage on the sliding surface, samples in accordance with the embodiment of the invention did not show any problem. By contrast, some of the samples for comparison exhibited seizure or attack on the counterpart.

As for resistance to corrosion caused by sulfur, the situation of corrosion of the samples was evaluated after the samples were dipped for 24 hours in TOYOTA 70W 90 oil which was kept at 140° C. As can be seen from Table 4, the samples in accordance with the embodiment of the invention did not show any problem with respect to corrosion. However, corrosion due to sulfur was observed in some of the samples for comparison.

Specific disadvantages of samples 24 to 39 for comparison are as follows.

In sample 24, the total content of Zn and Ni in the alloy base did not reach 5 wt %, and hence corrosion due to sulfur was observed in atmospheric exposure test of the sintered body sample in oil.

In sample 25, the total content of Zn and Ni in the alloy base exceeded 40 wt %, so that toughness of the sintered body was degraded.

In sample 26, the sintered body did not contain hard particles. Therefore, seizure was observed between a sliding member and a counterpart.

In sample 27, the content of hard particles in the sintered body did not reach 10 wt %. Therefore, the initial μ value was 0.12 and the final μ value was 0.81 as a result of seizure with the counterpart.

In sample 28, the content of hard particles in the sintered body exceeded 30 wt %. Therefore, strength and toughness of the sintered body were degraded.

In sample 29, the content of Sn in the alloy base exceeded 20 wt %. Therefore, the base became extremely hard and attacked the counterpart, and p value was increased.

In sample 30, the content of Si in the alloy base exceeded 5 wt %. and the toughness of the sintered body was degraded.

In sample 31, the content of Al in the alloy base exceeded 5 wt %. Therefore, sintering property was hindered, and strength and toughness of the sintered body were degraded.

In sample 32, the content of Pb in the alloy base exceeded 5 wt %. Therefore, Pb was segregated in the sintered body, and as a result, the strength and toughness of the sintered body were degraded.

In sample 33, the content of solid lubricant of graphite in the sintered body exceeded 3 wt %. Therefore, strength and toughness of the sintered body were degraded.

In sample 34, content of solid lubricant of $MoS_2$ in the sintered body exceeded 3 wt %. Therefore, strength and toughness of the sintered body were degraded.

In sample 35, pores included in the sintered body exceeded 20% by volume so that the strength and toughness of the sintered body were degraded.

In sample 36, average diameter of the pores exceeded 30 μm. Therefore, the strength and toughness of the sintered body were degraded.

In sample 37, maximum grain diameter of the hard particles exceeded 25 μm. Therefore, strength and toughness of the sintered body were degraded.

In sample 38, average grain diameter of the hard particles exceeded 10 μm. Therefore, strength and toughness of the sintered body were degraded.

In sample 39, only the powders of prescribed composition were mixed and sintered without any mechanical pulverization and mixing. Therefore, strength and toughness of the sintered material were degraded, a reaction layer was not formed between the hard particles and the matrix, and rough and large particles existed.

Therefore, at the time of sliding, hard particles became loose and fell out from the base, resulting in seizure with the counterpart.

As can be seen from Table 5, no matter whether the atomized copper alloy powder or metal powder group was used for the mechanical alloying process as the material of the matrix of the composite copper alloy powder, there is hardly any difference between the mechanical properties and friction sliding property of the obtained sintered bodies. Namely, according to the mechanical alloying method of the present invention, not only a copper alloy powder which has been alloyed in advance but also metal powder group having a prescribed compounding ratio may be similarly used.

TABLE 5

| | Mechanical Properties | | Friction Sliding Properties | | | | | Resistance to |
| | | | | | Amount of Wear mg | | | |
| Sample | UTS MPa | Elongation % | μ Value | Δμ | Sintered Material | S35C Material | Damages | Corrosion Due to Sulfur |
| --- | --- | --- | --- | --- | --- | --- | --- | --- |
| 41 | 451 | 6.9 | 0.36 | 0.07 | 5 | 5 | Not Observed | Not Observed |
| 42 | 448 | 7.0 | 0.36 | 0.06 | 6 | 5 | Not Observed | Not Observed |

Table 5 shows a result of evaluation of the influence of the powder used as the material of the matrix of the composite copper alloy powder on mechanical properties and friction sliding property of the sintered friction material. Samples 41

TABLE 6

| | Base | | | | Hard Particles | | | | High Temperature Hardness (MHv) | | | |
| | | | | | | Alumina Grain Diameter | UTS | | Room | | | |
| Sample | Zn | Ni | Cu | FeMo | Alumina | (μm) | MPa | Elongation | Temperature | 300° C. | 600° C. | 750° C. |
| --- | --- | --- | --- | --- | --- | --- | --- | --- | --- | --- | --- | --- |
| 51 | 18 | 18 | RP | 15 | 1.5 | 8 | 458 | 6.8 | 186 | 172 | 162 | 151 |
| 52 | 18 | 18 | RP | 15 | 3.3 | 8 | 467 | 6.6 | 194 | 184 | 176 | 165 |
| 53 | 18 | 18 | RP | 15 | 4.2 | 9 | 470 | 6.3 | 203 | 192 | 185 | 174 |
| 54 | 18 | 18 | RP | 15 | 0 | — | 440 | 7.2 | 164 | 150 | 126 | 101 |
| 55 | 18 | 18 | RP | 15 | 6.5 | 9 | 452 | 3.9 | 213 | 204 | 194 | 181 |

Note: Remaining Part → RP and 42 of Table 5 have the same composition as the composite copper alloy powder shown in FIG. 2, and were subjected to mechanical alloying process under the same condition except that the process time was changed to six hours. Here, in sample 41, atomized copper powder was used for a mechanical alloying process as the material of the matrix of the composite copper alloy powder, while in sample 42, a group of metal powders including Cu powder, Zn powder and Ni powder of a prescribed ratio was used. The mechanical properties and friction sliding property of the obtained sintered bodies were evaluated in the similar manner as for Table 4.

Table 6 shows the influence of alumina particles added, in addition to the intermetallic iron alloy, as the hard particles in composite copper alloy powder, on various mechanical properties of the sintered friction material. In samples 51 to 55 of Table 6, the composite copper alloy powder has the same composition except for the content of alumina. In these samples, the average grain diameter of alumina was 8 or 9 μm. However, it is considered that the alumina has substantially the same grain diameter overall. The composite copper alloy powder was fabricated by a mechanical alloying process similar to the powder of FIG. 2, except that the time for the mechanical alloying process was changed to seven hours. Every sample was processed to form a molded body of composite copper alloy powder, and sintered to form a sintered friction material having pores of 8,% by volume.

As apparent from Table 6, in sintered friction material samples 51 to 53 including alumina particles of at most 5 wt %, tensile strength UTS and elongation are not much changed as compared with sample 54 not including alumina particles. However, it is noted that high temperature hardness (MHv: microvickers hardness) is significantly improved. Meanwhile, in sample 55 including 6.5 wt % of alumina particles, exceeding 5 wt %, the high temperature hardness was significantly improved, while elongation was clearly degraded. More specifically, if superior high temperature properties are required of the sliding friction material, the sliding friction material should preferably include alumina particles up to 5 wt %, in addition to the intermetallic iron alloy, as the hard particles.

As can be seen from Table 7, samples 9A to 9E and 12A to 12E, which are compression molded to have a true density ratio of at least 70% and sintered for more than 30 minutes at a temperature in the range of 800 to 1100° C. in an atmosphere of an inert gas and/or reducing gas in accordance with the present invention, exhibit tensile strength UTS well exceeding 400 MPa and sufficient elongation exceeding 5%. The samples in accordance with the present invention did not exhibit any chipping or cracking of the molded body during the step of transportation or sintering of the molded bodies.

By contrast, samples 9F to 9K and 12F to 12H for comparison manufactured by a method out of the scope of the present invention exhibited tensile strength of smaller than 400 MPa and elongation of smaller than 4% and the samples had the following disadvantages.

Samples 9F and 12F had a true density ratio of the molded body of 65% and 66% respectively, which were smaller than

TABLE 7

| Sample | Pressure for Molding t/cm² | True Density Ratio of Molded Body % | Sintering Condition | | | Properties of Sintered Body | | Observation During Transportation · Sintering |
|---|---|---|---|---|---|---|---|---|
| | | | Temperature ° C. | Time Minutes | Atmosphere Gas | UTs MPa | Elongation % | |
| 9A | 4 | 72 | 1000 | 30 | N₂ 70% + H₂ 30% | 453 | 5.3 | Chip, Crack of Molded Body Not Observed During Transportation |
| 9B | 6 | 76 | 1000 | 30 | N₂ 70% + H₂ 30% | 465 | 5.6 | Chip, Crack of Molded Body Not Observed During Transportation |
| 9C | 8 | 81 | 1000 | 30 | N₂ 70% + H₂ 30% | 476 | 6.1 | Chip, Crack of Molded Body Not Observed During Transportation |
| 9D | 6 | 76 | 900 | 45 | Hydrogen (N₂) Gas | 462 | 5.7 | Chip, Crack of Molded Body Not Observed During Transportation |
| 9E | 6 | 76 | 1100 | 30 | Hydrogen (N₂) Gas | 468 | 5.9 | Chip, Crack of Molded Body Not Observed During Transportation |
| 12A | 4 | 73 | 1050 | 40 | N₂ 70% + H₂ 30% | 469 | 5.5 | Chip, Crack of Molded Body Not Observed During Transportation |
| 12B | 6 | 77 | 1050 | 40 | N₂ 70% + H₂ 30% | 473 | 5.7 | Chip, Crack of Molded Body Not Observed During Transportation |
| 12C | 8 | 83 | 1050 | 40 | N₂ 70% + H₂ 30% | 478 | 5.8 | Chip, Crack of Molded Body Not Observed During Transportation |
| 12D | 6 | 77 | 850 | 60 | Hydrogen (H₂) Gas | 471 | 5.6 | Chip, Crack of Molded Body Not Observed During Transportation |
| 12E | 6 | 77 | 1100 | 30 | Nitrogen (N₂) Gas | 475 | 5.9 | Chip, Crack of Molded Body Not Observed During Transportation |
| 9F | 3 | 65 | 1000 | 30 | N₂ 70% + H₂ 30% | 378 | 3.2 | Chip Observed During Transportation |
| 12F | 3 | 66 | 1050 | 40 | N₂ 70% + H₂ 30% | 384 | 3.4 | Chip Observed During Transportation |
| 9G | 6 | 76 | 700 | 60 | N₂ 70% + H₂ 30% | 315 | 2.4 | Sintering Not Sufficient Due to Low Temperature |
| 9H | 8 | 80 | 650 | 60 | N₂ 70% + H₂ 30% | 334 | 2.6 | Sintering Not Sufficient Due to Low Temperature |
| 9I | 6 | 75 | 1250 | 30 | N₂ 70% + H₂ 30% | 395 | 3.8 | Liquid Phase Appear, Sintering Not Sufficient |
| 9J | 6 | 76 | 1000 | 15 | N₂ 70% + H₂ 30% | 345 | 2.9 | Sintering Not Sufficient Due to Short Time |
| 12G | 5 | 73 | 1100 | 20 | N₂ 70% + H₂ 30% | 360 | 2.8 | Sintering Not Sufficient Due to Short Time |
| 9K | 6 | 75 | 1000 | 30 | Ambient Atmosphere | 280 | 1.6 | Sintering Hindered Due to Oxidation of Powder Surface |
| 12H | 6 | 76 | 1050 | 60 | Ambient Atmosphere | 265 | 1.4 | Sintering Hindered Due to Oxidation of Powder Surface |

Referring to Table 7, the influence of true density and conditions for sintering of the powder molded body on the mechanical properties of the sintered body are shown. With respect to Table 7, raw material powder corresponding to the compositions of samples 9 and 12 of Table 2 were mechanically mixed and pulverized, and the resulting powder was filled into a metal mold having a cross-section of 10×31 mm² by means of an automatic powder feeding apparatus, molded with various pressures and sintered to form sintered bodies under various sintering conditions.

70%. Therefore, chipping was observed in the molded bodies in the step of transportation of the molded bodies.

In samples 9G and 9H, the sintering temperature was 700° C. and 650° C., i.e. lower than 800° C., and therefore mechanical properties of the sintered bodies were not satisfactory.

In sample 9I, the sintering temperature was 1250° C., which was higher than 1200° C. Therefore, the molded body melted and a good sintered body could not be obtained.

Samples 9J and 12G were sintered for 15 minutes and 20 minutes respectively, which was shorter than 30 minutes, and hence mechanical properties of the sintered bodies were not sufficient.

Samples 9K and 12H were sintered in air so that an oxide film was formed on the surface of the powder, hindering sintering property, and therefore mechanical properties of the sintered bodies were not sufficient.

ciently made dense, and the effect of improving mechanical properties of the sintered body provided by forging was hardly observed.

In sample 12B11, the extrusion ratio at the time of hot extrusion was 7, which was smaller than 10, so that the sintered body was not sufficiently made dense, and hence improvement in mechanical properties of the sintered body provided by extrusion was small.

TABLE 8

| Sample | Preheating Temperature (° C.) | Pressure for Hot Forging | Hot Extrusion Ratio | Hot Press (° C.) | Mechanical Properties of Alloy | | Remarks |
|---|---|---|---|---|---|---|---|
| | | | | | UTS MPa | Elongation | |
| 12B1 | 600 | 8 | — | — | 549 | 6.4 | — |
| 12B2 | 800 | 8 | — | — | 559 | 6.5 | — |
| 12B3 | 1000 | 6 | — | — | 565 | 6.7 | — |
| 12B4 | 700 | — | 15 | — | 556 | 6.5 | — |
| 12B5 | 950 | — | 12 | — | 562 | 6.6 | — |
| 12B6 | 1050 | — | 10 | — | 578 | 6.7 | — |
| 4HP | — | — | — | 850 | 555 | 8.2 | — |
| 9HP | — | — | — | 950 | 580 | 8.0 | — |
| 12HP | — | — | — | 1000 | 575 | 8.0 | — |
| 12B7 | 400 | 8 | — | — | 485 | 5.9 | — |
| 12B8 | 450 | — | 15 | — | — | — | Die Clogged |
| 12B9 | 1100 | 8 | — | — | 584 | 6.9 | Sintered Body Contracted, Degrading Dimensional Precision |
| 12B10 | 1000 | 3 | — | — | 479 | 5.7 | |
| 12B11 | 950 | — | 7 | — | 496 | 5.9 | |
| 12B | — | — | — | — | 473 | 5.7 | — |

Table 8 shows results of evaluation of mechanical properties of the sintered alloy when the sintered material sample 12B of Table 7 was subjected to hot plastic deformation under various conditions and sintered material samples 4, 9 and 12 of Table 2 were hot pressed.

As can be seen from Table 8, samples 12B1 to 12B6 which were preheated to the temperature not higher than the sintering temperature Ts=1050° C. of sample 12B and not lower than 500° C. and subjected to hot plastic deformation under the conditions of manufacturing of the present invention exhibited tensile strength UTS well exceeding 500 MPa and sufficient elongation well exceeding 6%. It is apparent that samples 4HP, 9HP and 12HP obtained by hot pressing samples 4, 9 and 12 at various temperatures have superior mechanical properties. In the hot pressing, pressure of 6 t/cm² was applied for 30 minutes in a nitrogen gas atmosphere.

Meanwhile, samples 12B7 to 12B11 for comparison formed by the method of manufacturing out of the scope of the present invention suffered from the following problems.

Namely, in sample 12B7, the temperature of preheating was 400° C. which was lower than 500° C. so that the sintered body was not sufficiently made dense so that the effect of improving mechanical properties of the sintered body by hot forging was not sufficient.

In sample 12B8, the preheating temperature was 450° C. which was lower than 500° C., and hence the sintered body became clogged in the die at the time of extrusion.

In sample 12B9, the preheating temperature was 1100° C. exceeding the sintering temperature Ts=1050° C. Therefore, though the mechanical properties were improved, the sintered body contracted, resulting in degraded dimensional precision.

In sample 12B10, the pressure during hot forging was as small as 3 t/cm², so that the sintered body was not suffi- In Table 8, mechanical properties of sample 12B of Table 7 which was not subjected to hot plastic deformation is also shown for comparison.

TABLE 9

| | Graphite Powder | | Appearance of |
|---|---|---|---|
| Sample | Type | Content | Molded Body |
| 61 | Spherical | 2 wt % | Good, Chip - Crack Not Observed |
| 62 | Spherical | 3 wt % | Good, Chip - Crack Not Observed |
| 63 | Expanded | 2 wt % | Good, Chip - Crack Not Observed |
| 64 | Expanded | 8 wt % | Good, Chip - Crack Not Observed |
| 65 | Expanded | 15 wt % | Good, Chip - Crack Not Observed |
| 66 | Flaky | 2 wt % | Good, Chip - Crack Not Observed |
| 67 | Flaky | 6 wt % | Good, Chip - Crack Not Observed |
| 68 | Flaky | 14 wt % | Good, Chip - Crack Not Observed |
| 69 | Spherical | 4 wt % | Crack Generated Perpendicular to Pressurizing Direction |
| 70 | Expanded | 17 wt % | Cracks, Chips at Corners Observed |
| 71 | Flaky | 16 wt % | Cracks, Chips at Corners Observed |

Table 9 shows a result of inspection of pressed powder bodies when mixed powders including dispersed hard particles type composite copper alloy powder having the composition corresponding to sample 12 of Table 2 and spherical graphite powder, flaky graphite powder or expanded graphite powder included at various ratios were pressed and molded with the pressure of 7 t/cm². Referring to Table 9, it can be seen that when the content of spherical graphite powder exceeds 3 wt %, cracks and chipping were observed in the molded body, and the molding property is degraded. Meanwhile, it can be understood that flaky graphite powder or expanded graphite powder have a superior molding property as compared with the spherical graphite powder, as chipping or cracks were not observed in the molded body even when flaky or expanded graphite powder is included up to 15 wt % in the mixed powder.

TABLE 10

| Sample | Time Lapse (Sec) From Start Of Test | | | | | | | | | | | |
| --- | --- | --- | --- | --- | --- | --- | --- | --- | --- | --- | --- | --- |
| | 5 | 10 | 15 | 20 | 25 | 30 | 35 | 40 | 45 | 50 | 55 | 60 |
| 61A | 0.17 | 0.22 | 0.31 | 0.37 | 0.44 | 0.47 | 0.48 | 0.43 | 0.41 | 0.38 | 0.37 | 0.38 |
| 63A | 0.27 | 0.31 | 0.37 | 0.39 | 0.37 | 0.37 | 0.36 | 0.37 | 0.37 | 0.36 | 0.36 | 0.36 |
| 66A | 0.25 | 0.30 | 0.35 | 0.38 | 0.36 | 0.35 | 0.36 | 0.36 | 0.37 | 0.36 | 0.36 | 0.36 |

Table 10 shows the friction sliding properties of copper type sintered friction material samples 61A, 63A and 66A obtained by sintering molded bodies of samples 61, 63 and 66 of Table 9 in a nitrogen gas atmosphere at 980° C. for one hour, as the result of measurement of the change in the coefficient of dynamic friction at intervals of 5 seconds from the start of testing, by using the wet type friction tester shown in FIG. 4. The ratio of pores included in friction material samples 61A, 63A and 66A in this case was adjusted to 7% by volume. Referring to Table 10, as compared with the sample 61A including spherical graphite powder, samples 63A or 66A including flaky graphite powder or expanded graphite powder hardly exhibit a temporary increase of the coefficient of friction which is generally observed at the initial stage of testing (initial fitting phenomenon), and it can be understood that the samples have a stable coefficient of friction from the initial stage of sliding.

According to the present invention, a sintered friction material which is free from corrosion due to sulfur in oil containing sulfur, which can stably maintain a high coefficient of friction exceeding about 0.2 under wet type sliding and exceeding 0.4 under dry type sliding, which has a difference between the coefficient of static friction and the coefficient of the dynamic friction of at most 0.1, and which can solve the problem of vibration, chattering, creaky noise or the like at the time of sliding can be obtained in a highly economical manner. Further, the sintered friction material obtained by the present invention has low attacking properties against the counterpart at the time of friction sliding, is free from seizure and has satisfactory mechanical properties such as strength, toughness and hardness. Therefore, it can be used as a structural part by itself. Therefore, the sintered friction material in accordance with the present invention is preferably used as various friction members for a synchronizing ring of a transmission, a brake or clutch of a vehicle.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A composite powder comprising individual composite powder particles,
   wherein each one of said composite powder particles respectively includes a base material and a plurality of hard particles uniformly dispersed in said base material,
   wherein the content of said hard particles is within a range of from 10 to 30 wt. % of said composite powder, and
   wherein said base material comprises Cu, Zn and Ni, with a total content of said Zn and said Ni together being within a range of from 5 to 40 wt % of said base material.

2. The composite powder according to claim 1, wherein said hard particles have a maximum grain diameter of at most 25 $\mu$m and an average grain diameter of at most 10 $\mu$m.

3. The composite powder according to claim 1, wherein said base material further comprises Sn within a range of from 3 to 20 wt %.

4. The composite powder according to claim 3, wherein said base material further comprises at least one of 1 to 5 wt % of Si, 0.1 to 5 wt % of Al and 0.5 to 3 wt % of Pb.

5. The composite powder according to claim 1, wherein said hard particles comprise at least one intermetallic iron alloy selected from the group consisting of FeMo, FeCr, FeTi, FeW and FeB.

6. The composite powder according to claim 5, wherein said hard particles further comprise a positive amount up to 5 wt % of $Al_2O_3$ particles.

7. The composite powder according to claim 1, wherein each said composite powder particle has a longer dimension DL and a shorter dimension DS, wherein DL is within a range of 50 to 300 $\mu$m and an aspect ratio defined as DL/DS is within a range of from 1 to 5.

8. The composite powder according to claim 1, having a fluidity sufficient to flow 50 g of said composite powder down through an orifice tube having a diameter of 2.5 mm within 30 seconds.

9. The composite powder according to claim 1, further comprising up to 3 wt % of a solid lubricant dispersed in said base material.

10. The composite powder according to claim 9, wherein said solid lubricant comprises at least one of graphite, $MoS_2$, $CeF_2$ and BN.

11. A method of manufacturing the composite powder according to claim 2, comprising the steps of
    providing a powder of said base material and providing said hard particles,
    preparing a mixed powder by mixing together said base material powder and said hard particles, wherein said mixed powder includes from 10 to 30 wt % of said hard particles;
    performing mixing and pulverizing on said mixed powder by at least one of mechanical alloying, mechanical grinding and granulation to provide said composite powder, whereby said hard particles are pulverized to have said maximum grain diameter of at most 25 $\mu$m and said average grain diameter of at most 10 $\mu$m, and said hard particles are simultaneously uniformly dispersed in particles of said base material powder forming a matrix of said composite powder particles.

* * * * *

UNITED STATES PATENT AND TRADEMARK OFFICE
CERTIFICATE OF CORRECTION

PATENT NO. : 5,972,070

DATED : Oct. 26, 1999

INVENTOR(S) : Kondoh et al.

It is certified that error appears in the above-identified patent and that said Letters Patent is hereby corrected as shown below:

On the Title Page: in [57] ABSTRACT,
    line 7, after "amount", delete "j";
Col. 1, line 45, after "been", delete "is";
Col. 4, line 22, after "10", replace "pm" by --$\mu$m--;
    line 37, after "a", delete "the";
Col. 6, line 43, after "friction", delete "of";
Col. 9, line 37, is", replace "frqm" by --from--;
Col. 10, line 49, after "powder", insert --,--;
Col. 19, line 48, after "coefficient", replace "p" by --$\mu$--;
    line 51, after "value", replace "p$\mu$" by --$\mu$--;
Col. 20, line 48, after "and", replace "p" by --$\mu$--;
Col. 23, line 3, after "of", replace "8,%" by --8%--;
TABLE 7, under Atmosphere Gas, (col. 6), line 4, replace "Hydrogen ($N_2$)" by --Hydrogen ($H_2$)--;
TABLE 7, under Atmosphere Gas, (col. 6), line 6, replace "Hydrogen ($N_2$)" by --Nitrogen ($N_2$)--;
Col. 25, line 54, after "dense", insert --,--

Signed and Sealed this

Thirtieth Day of May, 2000

*Attest:*

Q. TODD DICKINSON

*Attesting Officer*      *Director of Patents and Trademarks*